United States Patent
Kim et al.

(10) Patent No.: US 11,144,157 B2
(45) Date of Patent: Oct. 12, 2021

(54) ELECTRONIC APPARATUS

(71) Applicant: SAMSUNG DISPLAY CO., LTD., Yongin-si (KR)

(72) Inventors: Incheol Kim, Yongin-si (KR); Ilho Lee, Yongin-si (KR); Namheon Kim, Yongin-si (KR); Seunghwan Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 78 days.

(21) Appl. No.: 15/619,932

(22) Filed: Jun. 12, 2017

(65) Prior Publication Data

US 2017/0364230 A1    Dec. 21, 2017

(30) Foreign Application Priority Data

Jun. 21, 2016 (KR) .................. 10-2016-0077500

(51) Int. Cl.
| | | |
|---|---|---|
| *G06F 3/041* | (2006.01) | |
| *G06F 3/044* | (2006.01) | |
| *G06F 3/01* | (2006.01) | |
| *G06F 3/0484* | (2013.01) | |
| *G06F 3/0488* | (2013.01) | |

(52) U.S. Cl.
CPC .......... *G06F 3/04166* (2019.05); *G06F 3/016* (2013.01); *G06F 3/041* (2013.01); *G06F 3/0443* (2019.05); *G06F 3/0488* (2013.01); *G06F 3/04144* (2019.05); *G06F 3/04845* (2013.01); *G06F 2203/04106* (2013.01); *G06F 2203/04808* (2013.01)

(58) Field of Classification Search
CPC ....... G06F 3/044; G06F 3/0414; G06F 3/0362
See application file for complete search history.

(56) References Cited

U.S. PATENT DOCUMENTS

| | | | |
|---|---|---|---|
| 8,988,384 B2 | 3/2015 | Krah et al. | |
| 10,007,371 B2 | 6/2018 | Kim et al. | |
| 10,013,121 B2 | 7/2018 | Wang et al. | |
| 10,261,614 B2* | 4/2019 | Chuang | G06F 3/0443 |
| 10,452,185 B2 | 10/2019 | Kim et al. | |
| 2009/0273573 A1* | 11/2009 | Hotelling | G06F 3/0362 345/173 |
| 2012/0299866 A1* | 11/2012 | Pao | G06F 3/044 345/174 |
| 2013/0215056 A1* | 8/2013 | Johansson | G01R 27/14 345/173 |

(Continued)

FOREIGN PATENT DOCUMENTS

| | | |
|---|---|---|
| CN | 103793120 A | 5/2014 |
| CN | 105278788 A | 1/2016 |

(Continued)

*Primary Examiner* — Kevin M Nguyen
(74) *Attorney, Agent, or Firm* — Lewis Roca Rothgerber Christie LLP

(57) ABSTRACT

An electronic apparatus includes a touch sensor, a driving circuit, and a switching circuit. The driving circuit includes a first detector and a second detector. The first detector transmits/receives an electrical signal to detect a position of a touch. The second detector transmits/receives an electrical signal to detect an intensity of the touch. The switching circuit selectively connects the first detector or the second detector to the sensor.

8 Claims, 15 Drawing Sheets

(56) References Cited

U.S. PATENT DOCUMENTS

| | | | |
|---|---|---|---|
| 2015/0035797 A1* | 2/2015 | Shahparnia | G06F 3/041 |
| | | | 345/174 |
| 2015/0268783 A1 | 9/2015 | Yoon et al. | |
| 2017/0023420 A1* | 1/2017 | Vosgueritchian | G06F 3/0414 |
| 2017/0285799 A1* | 10/2017 | Iuchi | G06F 3/0414 |
| 2017/0315653 A1* | 11/2017 | Vandermeijden | G06F 3/0447 |

FOREIGN PATENT DOCUMENTS

| | | |
|---|---|---|
| JP | 2016040734 A | 3/2016 |
| KR | 10-2012-0073140 A | 7/2012 |
| KR | 10-2013-0035243 A | 4/2013 |
| KR | 10-2016-0000100 A | 1/2016 |
| KR | 10-2016-0008302 A | 1/2016 |

* cited by examiner

ELECTRONIC APPARATUS

CROSS-REFERENCE TO RELATED APPLICATIONS

Korean Patent Application No. 10-2016-0077500, filed on Jun. 21, 2016, and entitled: "Electronic Apparatus," is incorporated by reference herein in its entirety.

BACKGROUND

1. Field

One or more embodiments described herein relate to an electronic apparatus.

2. Description of the Related Art

Many electronic devices have displays with touch screens. These displays may be provided with conductive patterns that are activated by electrical signals. When activated, information may be displayed in areas for receiving touch inputs. The touch inputs may control various applications or functions of the electronic devices.

SUMMARY

In accordance with one or more embodiments, an electronic apparatus includes a base substrate; a sensor, on the base substrate, to detect a touch; a driving circuit including a first detector to transmit/receive an electrical signal to detect a position of the touch and a second detector to transmit/receive an electrical signal to detect an intensity of the touch; and a switching circuit to selectively connect one of the first detector or the second detector to the sensor.

The sensor may be connected to the first detector and is to be activated by the first detector in a first mode, and the sensor may be connected to the second detector and is to be activated by the second detector in a second mode different from the first mode. The sensor may include at least one sensing pattern; at least one first sensing line connected to a first side of the at least one sensing pattern; and at least one second sensing line connected to a second side of the at least one sensing pattern and the at least one second sensing line, wherein the switching circuit is to connect at least one of the at least one first sensing line or the at least one second sensing line to the driving circuit according to the first mode and the second mode.

The electronic apparatus may include a plurality of sensing patterns, a plurality of first sensing lines, and a plurality of second sensing lines, wherein the touch is to be applied to at least one of the sensing patterns. The sensing patterns, the first sensing lines, and the second sensing lines may be on a same layer. The sensing patterns may be arranged in a matrix. The sensor may detect the position of the touch in the first mode based on a self-capacitance measurement of each of the sensing patterns.

The sensor may detect the intensity of the touch in the second mode based on a deformation of shape of each of the sensing patterns in response to the touch. The deformation of shape of each of the sensing patterns may correspond to a change in a planar area of each of the sensing patterns. Each of the sensing patterns may include a strain gauge.

The first detector may be connected to the first sensing line in the first mode, and the second detector may be connected to the first sensing line and the second sensing line in the second mode. The switching circuit may include a first switch to control a connection between the first sensing line and the driving circuit; and a second switch to control a connection between the second sensing line and the driving circuit. In the first mode, the first switch may turn on and the second switch is to turn off, and in the second mode each of the first switch and the second switch may turn on.

The switching circuit may include a third switch to control a connection between the first sensing line and the second sensing line. The third switch may turn on in the first mode and turn off in the second mode. The first switch may include a first sub switch to control a connection between the first sensing line and the first detector; and a second sub switch to control a connection between the first sensing line and the second detector, wherein the second switch is to control a connection between the second sensing line and the second detector. In the first mode, the first sub switch is to turn on and the second sub switch may turn off, and in the second mode the first sub switch it to turn off and the second sub switch and the second switch may turn on.

The electronic apparatus may include a display layer, between the base substrate and the sensor, to display an image; and an encapsulation layer between the display layer and the sensor and covering the display layer. The sensor may be directly disposed on the encapsulation layer.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
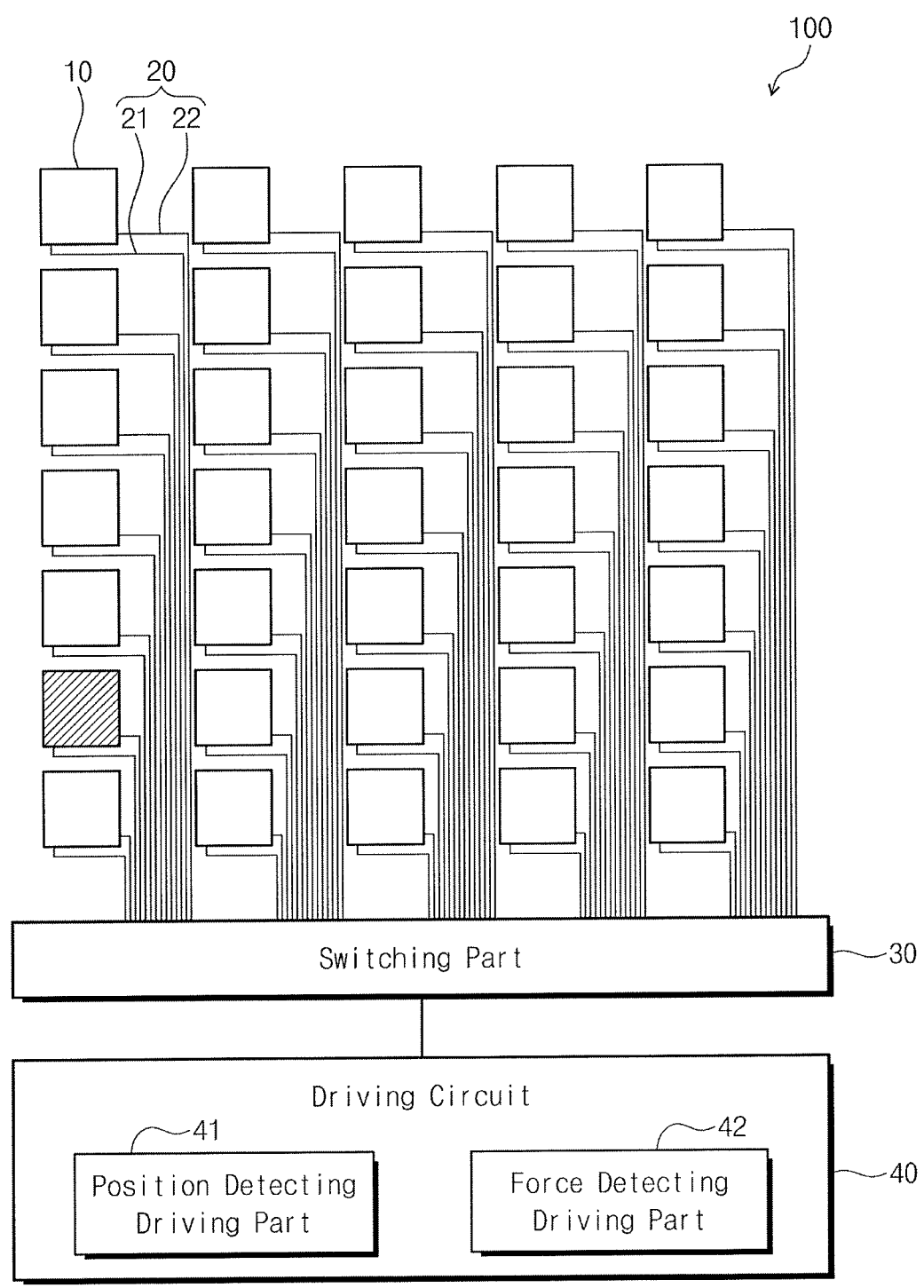
FIG. 1 illustrates an embodiment of an electronic apparatus.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of an electronic apparatus 100 for detecting the position and intensity (e.g., pressure) of a touch. The touch may be from an object (e.g., body part, stylus, etc.) that approaches or is brought into contact with the electronic apparatus 100.

Referring to FIG. 1, electronic apparatus 100 includes a sensor which includes a plurality of sensing patterns 10 and a plurality of sensing lines, a switching part 30, and a driving circuit 40. The sensing patterns 10 are arranged in spaced relation to each other on a plane. The sensing patterns 10 may be arranged in a matrix. Each of the sensing patterns 10 includes a conductive material, e.g., at least one of a metal, conducive oxide, or conductive polymer. Each of the sensing patterns 10 may be optically transparent. For example, each sensing pattern 10 may have, for example, a transmittance of 80% or more, which may correspond to a transparent state. Features under the sensor may be seen from the outside through the sensing patterns 10. The sensing patterns 10 may detect the touch. In FIG. 1, one sensing pattern, to which a touch is applied, of the sensing patterns 10 is illustrated with hatching.

The electronic apparatus 100 may detect the position and intensity of the touch through the sensing pattern illustrated with hatching. The sensing patterns 10 may be arranged on the same layer, e.g., a thin, single layer sensor may be provided.

The sensing lines 20 are connected to the sensing patterns 10 and transmit electrical signals. The sensing lines 20 provide the sensing patterns 10 with an electrical signal applied from the outside or transmit an electrical signal that the plurality of sensing patterns 10 generate.

The sensing lines 20 include a plurality of first sensing lines 21 and a plurality of second sensing lines 22. The first sensing lines 21 are connected to the sensing patterns 10, respectively. The second sensing lines 22 are connected to the sensing patterns 10, respectively. The sensing lines 20 may include a material having high conductivity, e.g., at least one of metal, conductive polymer, conductive oxide, or conductive particle.

The sensing lines 20 may include the substantially same material as the sensing patterns 10. For example, when the sensing patterns 10 include a transparent material, the sensing lines 20 may also be optically transparent.

When the sensing lines 20 are formed of the same material as the sensing patterns 10, the sensing patterns 20 and the sensing patterns 10 may be patterned at the same time using the same mask. Accordingly, process costs and time may be reduced. In one embodiment, the sensing lines 20 may be formed of different materials.

The sensing lines 20 may transmit different signals based on time. For example, the sensing lines 20 may transmit a first signal in one period and a second signal different from the first signal in another period. The first signal and the second signal may be signals provided by different driving parts or may be generated based on different inputs. For example, the first signal may be an electrical signal for detecting touch position, and the second signal may be an electrical signal for detecting touch intensity.

The switching part 30 is connected to the sensing lines 20. First ends of the first sensing lines 21 are connected to the sensing patterns 10, respectively. Second ends of the first sensing lines 21 are connected to the switching part 30. First ends of the second sensing lines 22 are connected to the sensing patterns 10, respectively. Second ends of the second sensing lines 22 are connected to the switching part 30.

The switching part 30 may connect or disconnect between the sensing lines 20 and the driving circuit 40. The switching part 30 may selectively connect at least one kind of the sensing lines of the first sensing lines 21 or the second sensing lines 22 to the driving circuit 40 based on time.

The driving circuit 40 is connected to the switching part 30 and includes a position detecting driving part 41 and a force detecting driving part 42. The position detecting driving part 41 includes a circuit to detect the position of a touch applied from the outside. When the sensor is connected to the position detecting driving part 41, the point to which the touch is applied may be detected. The position detecting driving part 41 detects the one sensing pattern (e.g., illustrated with hatching) of the sensing patterns 10 and provides a user with information about the position to which the touch is applied.

The force detecting driving part 42 includes a circuit to detect intensity of a touch applied from the outside. When the sensor is connected to the force detecting driving part 42, intensity of the touch may be detected. The force detecting driving part 42 detects the pressure applied to the one sensing pattern (e.g., illustrated with hatching) and provides the user with information about the intensity of the applied touch.

The position detecting driving part 41 and the force detecting driving part 42 may be selectively connected to the sensor by the switching part 30. For example, the electronic apparatus 100 may be driven in each of a first mode for detecting the touch position and a second mode for detecting the touch intensity.

The electronic apparatus 100 may be driven by the position detecting driving part 41 in the first mode and by the force detecting driving part 42 in the second mode. The position detecting driving part 41 and the force detecting driving part 42 may be operated at different times, e.g., the first and second modes may be implemented at different times.

The first mode and the second mode may be activated by a control unit. The control unit selects the first mode or second mode for operation and activates the switching part 30. The control unit may be, for example, outside the electronic apparatus 100 or in the driving circuit 40.

The first mode and the second mode may be determined based on a selection of the user. Accordingly, the electronic apparatus 100 may include an input unit, and the user may select the activation mode of the electronic apparatus 100 using the input unit.

Thus, the electronic apparatus 100 may detect with one sensor the position and intensity of a touch. Since the sensing patterns 10 are provided on one layer, the electronic apparatus 100 may detect both the point to which the touch is applied and the intensity of the applied touch with only a single conductive layer. Accordingly, a slim type touch-pressure detection device may be provided.

Figure 2:
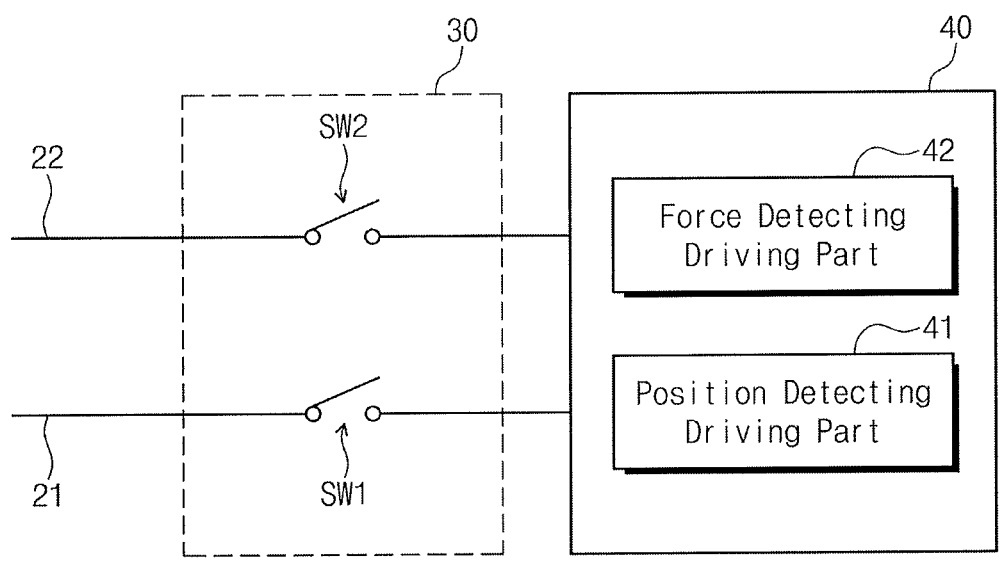
FIG. 2 illustrates an embodiment of a switching part and driving circuit.
Figure 3A:
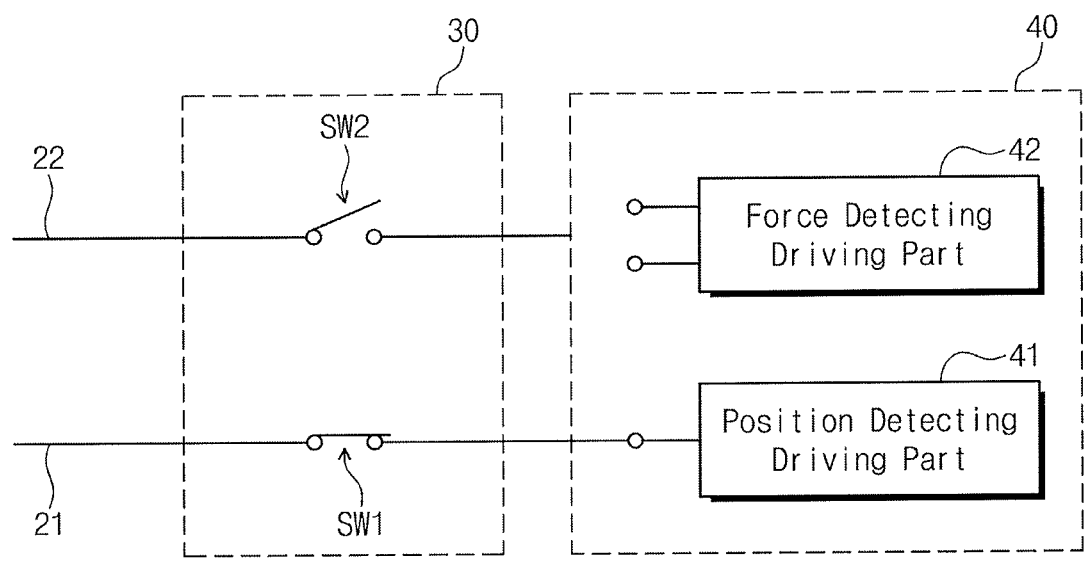
FIGS. 3A and 3B illustrates different connection states of the switching part and driving circuit according to an embodiment.
Figure 3B:
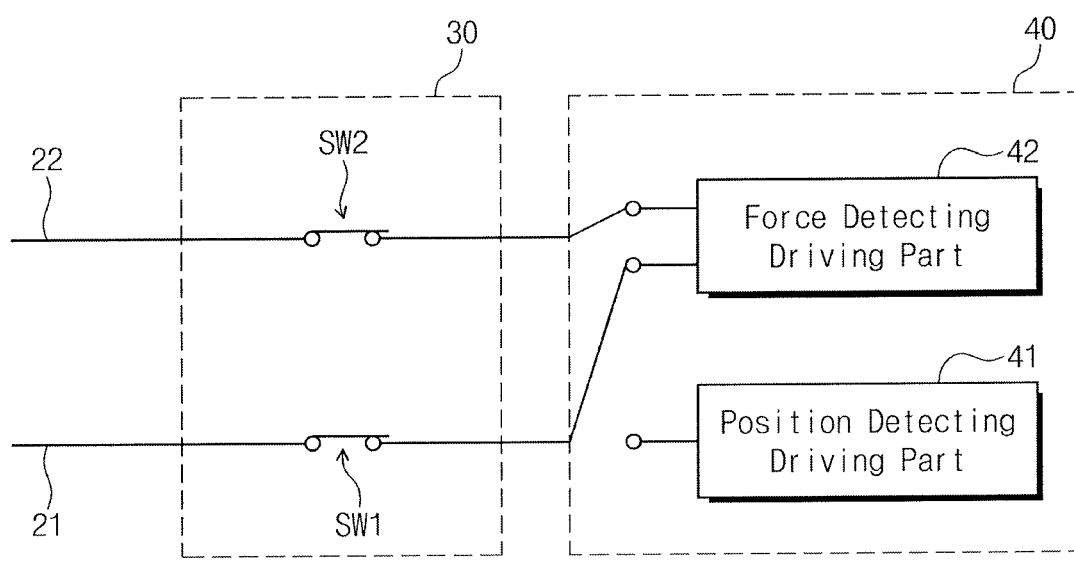

FIG. 2 illustrates an embodiment of the switching part 30 and the driving circuit 40, and FIGS. 3A and 3B illustrates different connection states of the switching part 30 and driving circuit 40 at different times, or modes, according to an embodiment.

The switching part 30 may include a plurality of switching elements, e.g., a first switching element SW1 and a second switching element SW2 which respectively correspond to one sensing line 21 and one second sensing line 22. In one embodiment, a plurality of first sensing device SW1 and/or a plurality of second sensing device SW2 may be provided and respectively connected to the first sensing lines and the second sensing lines.

The first switching element SW1 is between the first sensing line 21 and the driving circuit 40 to control a connection between the first sensing line 21 and the driving circuit 40. The first sensing line 21 may be a signal transmission line connected to the driving circuit 40 by the first switching element SW1 or may be a conductive pattern connected to only the sensing pattern 10 (e.g., see FIG. 1).

The second switching element SW2 is between the second sensing line 22 and the driving circuit 40 to control a connection between the second sensing line 22 and the driving circuit 40. The second sensing line 22 may be a signal transmission line connected to the driving circuit 40 by the second switching element SW2 or may be a conductive pattern connected to only the sensing pattern 10.

Referring to FIGS. 3A and 3B, the position detecting driving part 41 and the force detecting driving part 42 are connected to the sensor at different times, e.g., are not simultaneously connected at the same time.

FIG. 3A illustrates operation of the electronic apparatus in a first mode for detecting a touch position according to one embodiment. In the first mode, one of the first switching element SW1 or the second switching element SW2 may be selectively turned on. For example, in the first mode illustrated in FIG. 3A, the first switching element SW1 may be turned on and the second switching element SW2 may be turned off. The first sensing line 21 is connected to the position detecting driving part 41 of components of the driving circuit 40.

The position detecting driving part 41 may activate the sensing patterns through the first sensing line 21. Also, the position detecting driving part 41 may receive an electrical signal generated in the sensor through the first sensing line 21 and detect the touch position. However, the second sensing line 22 is opened and not connected to the position detecting driving part 41. Although the second sensing line 22 is electrically connected to the sensor and thus may have the same voltage as the sensor, it may be hard for the second sensing line 22 to receive the electrical signal directly from the driving circuit 40.

In the second mode illustrated in FIG. 3B, both the first switching element SW1 and the second switching element SW2 may be turned on. Accordingly, the first sensing line 21 and the second sensing line 22 are connected to the driving circuit 40. The first sensing line 21 and the second sensing line 22 may be connected to the force detecting driving part 42 of components of the driving circuit 40. The first sensing line 21 is connected to one terminal of the force detecting driving part 42. The second sensing line 22 is connected to the other terminal of the force detecting driving part 42.

The first sensing line 21 and the second sensing line 22 may transmit different electrical signals. For example, the first sensing line 21 may transmit a driving signal from the driving circuit 40 to the sensing pattern. The second sensing line 22 may transmit a signal from the sensing pattern to the driving circuit 40.

Accordingly, only one sensing line of the first or second sensing lines 21 and 22 operates in the first mode. The electronic apparatus 100 may detect the position of the touch with the sensor in which one sensing line is connected to one sensing pattern. On the contrary, both the first and second sensing lines 21 and 22 operate in the second mode. The electronic apparatus 100 may therefore detect the intensity of the touch with a sensor in which two sensing lines are connected to one sensing pattern.

Thus, the electronic apparatus 100 according to one embodiment may operate in different modes at different times. The switching part 30 activates the first mode and the second mode at the different times. Accordingly, the electronic apparatus 100 may detect the position and pressure of the touch with one sensing pattern.

Figure 4A:
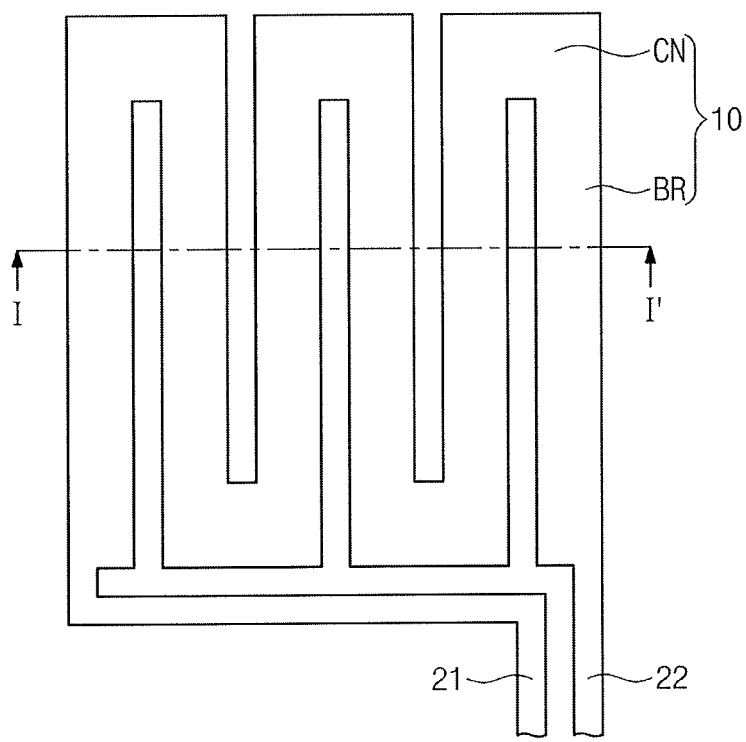
FIG. 4A illustrates an embodiment of a sensing pattern including first and second sensing lines, and FIG. 4B illustrations a view along section line I-I' in FIG. 4A.
Figure 4B:
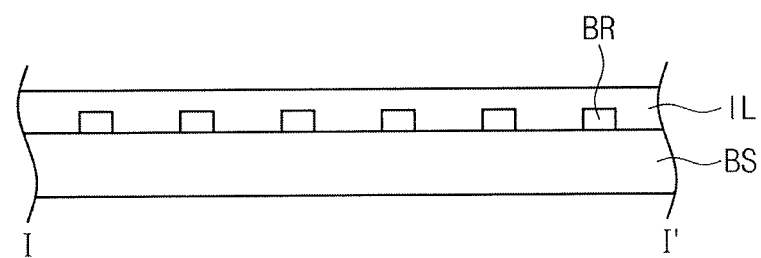

FIG. 4A illustrates an embodiment of a sensing pattern 10 of the first and second sensing lines 21 and 22, and FIG. 4B is a cross-sectional view taken along line I-I' in FIG. 4A. The sensing pattern 10 may be a pressure detection pattern operating in the second mode. For example, the sensing pattern 10 may function as one strain gauge. When a plurality of sensing patterns 10 are provided, each of the sensing patterns 10 may have the structure in FIGS. 4A and 4B.

The sensing pattern 10, as a strain gauge, may be deformed by external force to detect the intensity of the external force. The sensing pattern 10 detects the intensity of the external force according to the degree of deformation in length within a predetermined cross-sectional area. As the sensing pattern 10 increases in length in the same cross-sectional area, sensing pattern 10 may detect a minute pressure difference.

The sensing pattern 10 may also operate as the touch position detection pattern in the first mode. An area occupied by the sensing pattern 10 may increase within a predetermined cross-sectional area. Thus, the electronic apparatus may easily judge whether the touch is applied to corresponding position.

The sensing pattern 10 may have a curved shape with one or more bent portions. Accordingly, since the sensing pattern 10 has a longer length within a same area, detection of minute pressure may be facilitated. Also, since the sensing pattern 10 has a larger area, detection of the touch position may be facilitated.

For example, as illustrated in FIG. 4A, the sensing pattern 10 may include a plurality of branch parts BR and a plurality of connection parts CN. The branch parts BR and the connection parts CN may be alternately arranged.

One connection part may be arranged to connect two branch parts adjacent to each other. Each of the branch parts BR may extend in a first direction. The branch parts BR may be arranged in a spaced relation in a second direction crossing the first direction. The branch parts BR may be parallel to each other in the second direction.

The connection parts CN may extend in the second direction. The connection parts CN may be arranged to be spaced from each other. Some portions of the connection parts CN may be arranged in the second direction and may connect two branch parts adjacent to each other.

Other portions of the connection parts CN are spaced from the some portions in the first direction and may connect two branch parts arranged in the second direction and adjacent to each other. The branch parts BR and the connection parts CN are alternately arranged in the second direction. Thus, the adjacent parts may be connected to each other.

Any one of the branch parts BR may be connected to the first sensing line 21. Another of the branch parts BR may be connected to the second sensing line 22.

One portion of the sensing pattern 10 is connected to the first sensing line 21. Another portion of the sensing pattern 10 is connected to the second sensing pattern 22. Accordingly, the sensing pattern 10 may have a curved shape in which the one conductive line (including one end connected to the first sensing line 21 and the other end connected to the second sensing line 22) substantially forms the bent portions.

As illustrated in FIG. 4B, the branch parts BR are arranged to be spaced from each other. The sensing pattern 10 may be between a base substrate BS and an insulation layer IL.

The base layer BS may include an insulation material. For example, the base layer BS may be an insulation layer, an insulation film, or a plurality of thin films including an organic film and/or an inorganic film.

The insulation layer IL is on the base layer BS and covers the sensing pattern 10. The sensing pattern 10 may be electrically insulated from other components by the insulation layer IL. The insulation layer IL may be filled in spaces that are spaced from each other between the branch parts BR. The insulation layer IL may surround a top surface and side surfaces of the sensing pattern 10.

As illustrated in FIG. 4B, the sensing pattern 10 may be a single layer between the base layer BS and the insulation layer IL. The electronic apparatus according to the present embodiment may detect, through the sensing pattern 10 that is a single conductive pattern, both whether the touch is applied to the sensing pattern 10 and how intense the touch is. According to the present embodiment, an electronic apparatus that is slim and has various functions may be provided.

Figure 5A:
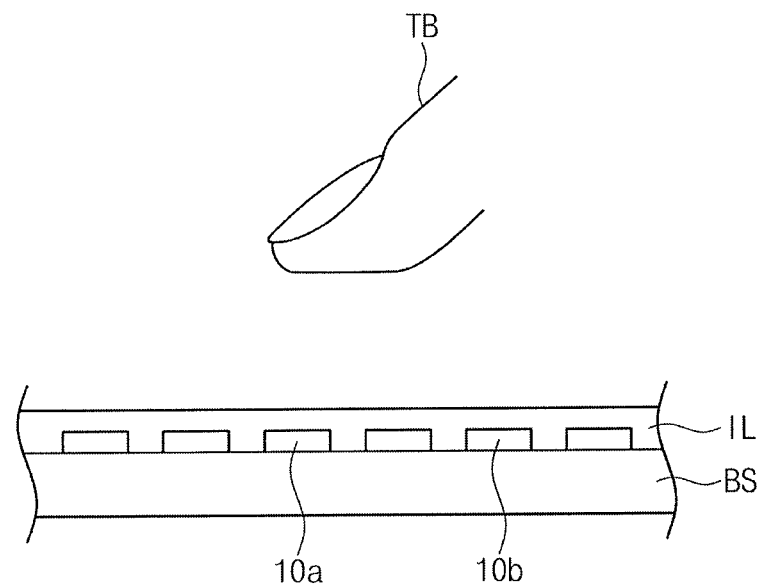
FIGS. 5A and 5B illustrate an example of the operation of the electronic apparatus in a first mode.
Figure 5B:
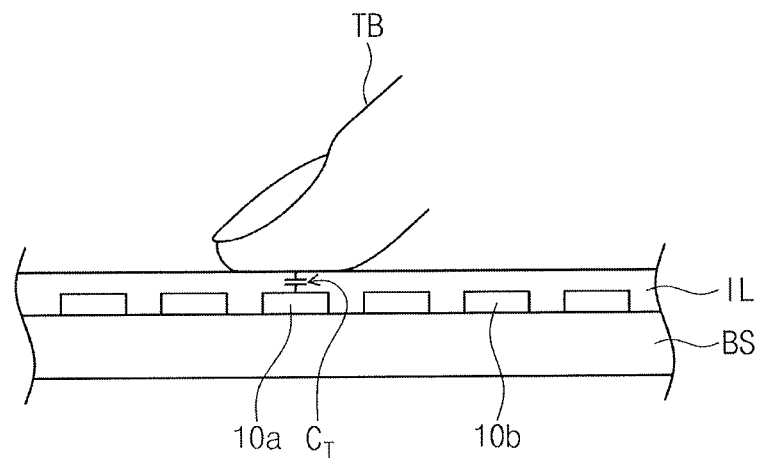
Figure 6A:
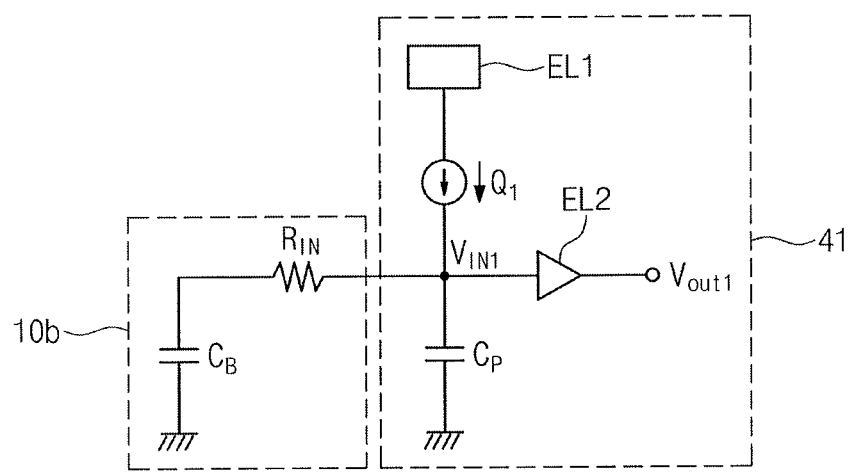
FIGS. 6A and 6B illustrate another example of the operation of an electronic apparatus in a first mode.
Figure 6B:
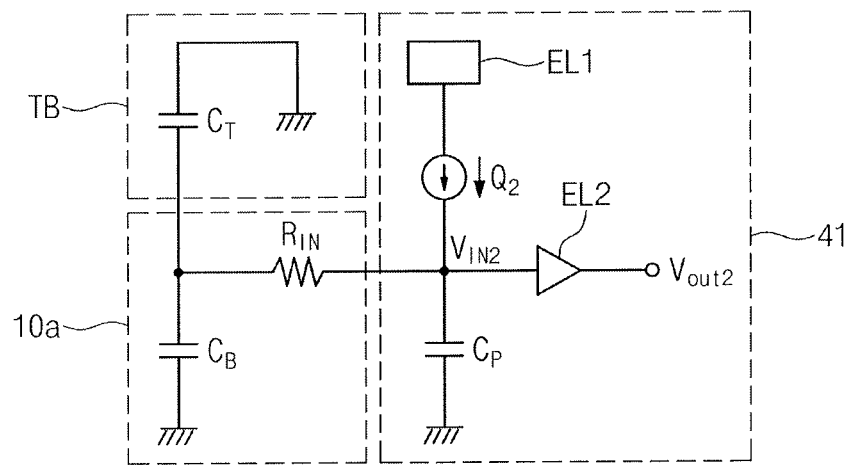

FIGS. 5A and 5B are cross-sectional views illustrating an example of the operation of the electronic apparatus in the first mode. FIGS. 6A and 6B illustrate embodiments of circuits illustrating the operation of the electronic apparatus in the first mode. Some of the sensing patterns are illustrated in FIGS. 5A and 5B. The circuits in FIGS. 6A and 6B may relate to one sensing pattern.

In particular, FIG. 5A illustrates a state before a touch is applied, and FIG. 5B illustrates a state in which the touch is applied. FIG. 6A may relate to a second sensing pattern 10b of FIG. 5B, and FIG. 6B may relate to a first sensing pattern 10a of FIG. 5B. Operation of the electronic apparatus in the first mode will be described with reference to FIGS. 5A to 6B.

The electronic apparatus according to one embodiment may detect information about a point to which the touch is applied by measuring a self-capacitance in the first mode. As illustrated in FIGS. 5A and 5B, when a touch TB is applied to the sensing patterns 10 in the first mode, a touch capacitance $C_T$ may be generated between the touch TB and the first sensing pattern 10a, which corresponds to a point to which the touch TB is applied. The touch capacitance $C_T$ may be realized by the touch TB, the sensing pattern 10, and the insulation IL corresponding to one conductor. On the contrary, the touch capacitance $C_T$ may not be generated at the second sensing pattern 10b, which is irrelevant to the point to which the touch TB is applied.

Referring to FIG. 6A, since the sensing patterns 10 are connected to the position detecting driving part 41, the second sensing pattern 10b is also connected to the position detecting driving part 41. As described above, the second sensing pattern 10b may be connected to the position detecting driving part 41 through the first sensing line 21 (e.g., see FIG. 1).

The position detecting driving part 41 may include a first electronic element EL1 and a second electronic element EL2 electrically connected to the first sensing pattern 21. The first electronic element EL1 may be a current supplying device. In the first mode, the first electronic element EL1 supplies an electrical signal, which corresponds to a first quantity of electric charge $Q_1$, to the first sensing line 21.

The electrical signal corresponding to the first quantity of electric charge $Q_1$ may generate predetermined base capacitance $C_B$ to the second sensing pattern 10b. Although the touch TB is applied, the second sensing pattern 10b may have the base capacitance $C_B$ based on interaction between a self-contained predetermined internal resistor $R_{IN}$ and other conductive devices. In one embodiment, the base capacitance $C_B$ in the second conductive pattern 10b may be omitted.

The electrical signal corresponding to the first quantity of electric charge $Q_1$ may generate parasitic capacitance $C_P$ to other devices corresponding to the position detecting driving part 41. In one embodiment, parasitic capacitance $C_P$ may be omitted according to the design of the position detecting driving part 41.

The second electronic element EL2 may be a device that is connected to the first sensing line 21 to receive an electrical signal $V_{IN1}$ and that converts the electrical signal $V_{IN1}$ to a detectable output signal $V_{OUT1}$. For example, the second electronic element EL2 may be an amplifying device that allows the electrical signal $V_{IN1}$ of the first sensing line 21 to be amplified into the output signal $V_{OUT1}$ including the information about the touch position. In one embodiment, when the electrical signal $V_{IN1}$ is output in an analog form, the second electronic element EL2 may further include a converting device that allows the electrical signal $V_{IN1}$ to be converted to digital form.

The electrical signal $V_{IN1}$ of the first sensing line 21 connected to the second sensing pattern 10b, to which the touch is not applied, may correspond to an electrical signal substantially corresponding to the first quantity of electric charge $Q_1$. Also, the output signal $V_{OUT1}$ may a signal corresponding to the electrical signal $V_{IN1}$.

The position detecting driving part 41 may detect the output signal VOUT1 to determine whether the touch is applied to the second sensing pattern 10b. Also, the position detecting driving part 41 may sense output signals from the sensing patterns 10 and detect a sensing pattern corresponding to a point to which the touch is applied.

Referring to FIG. 6B, as the touch TB is applied, the touch capacitance $C_T$ may be further formed between the touch TB and the first sensing pattern 10a. The first electronic element EL1 supplies an electrical signal corresponding to a second quantity of electric charge $Q_2$.

When the second quantity of electric charge $Q_2$ is maintained substantially equal to the first quantity of electric charge $Q_1$, an electrical signal $V_{IN2}$ of the first sensing line 21 may be different from the electrical signal $V_{IN1}$ of FIG. 6A due to the touch capacitance $C_T$. The capacitance generated in the first sensing pattern 10a may increase due to combination of the base capacitance $V_B$ and the touch capacitance $C_T$ compared to that before the touch TB occurs.

Accordingly, the electrical signal $V_{IN2}$ of the first sensing pattern 21 may be greater than the electrical signal $V_{IN1}$ of FIG. 6A. The electrical signal $V_{IN2}$ of the first sensing line 21 may be amplified through the second electrical EL2 and converted to an output signal $V_{OUT2}$.

The output signal $V_{OUT2}$ is generally proportional to the electrical signal $V_{IN2}$. Thus, the position detecting driving part 41 may sense the output signal $V_{OUT2}$ changed according to application of the touch TB and thus may detect the point to which the touch is applied. According to the present embodiment, although the sensing pattern is connected to the driving circuit with only one sensing line of two sensing lines, the electronic apparatus may easily detect the touch position.

Figure 7A:
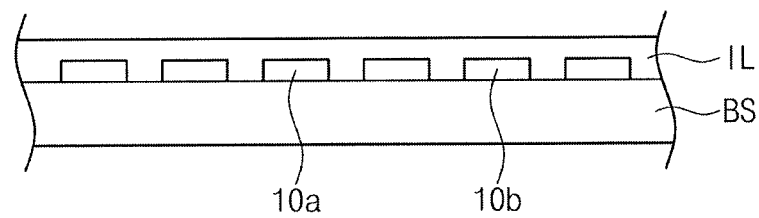
FIGS. 7A and 7B illustrate an example of the operation of an electronic apparatus in a second mode.
Figure 7B:
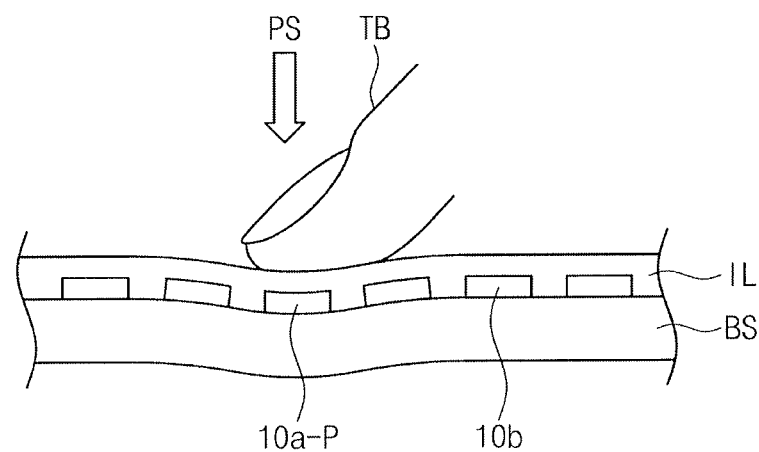
Figure 7C:
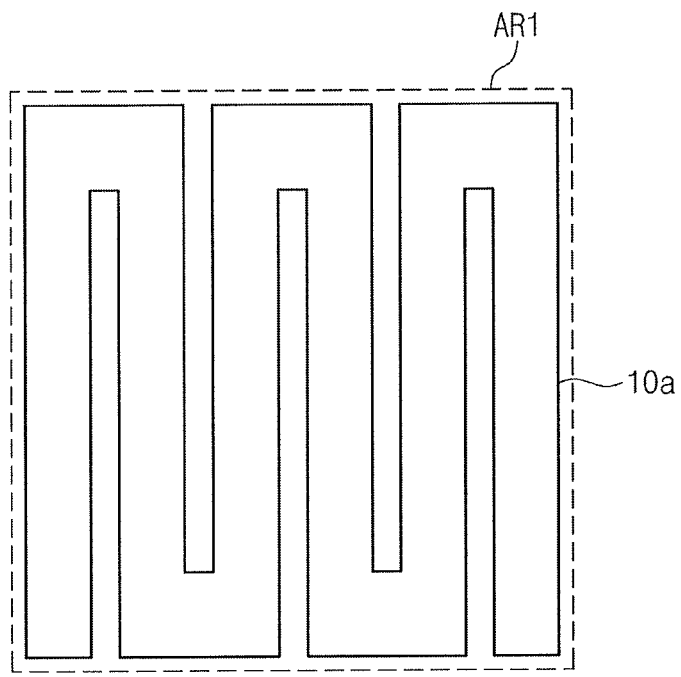
FIGS. 7C and 7D illustrate examples of a change of a sensing pattern in the second mode.
Figure 7D:
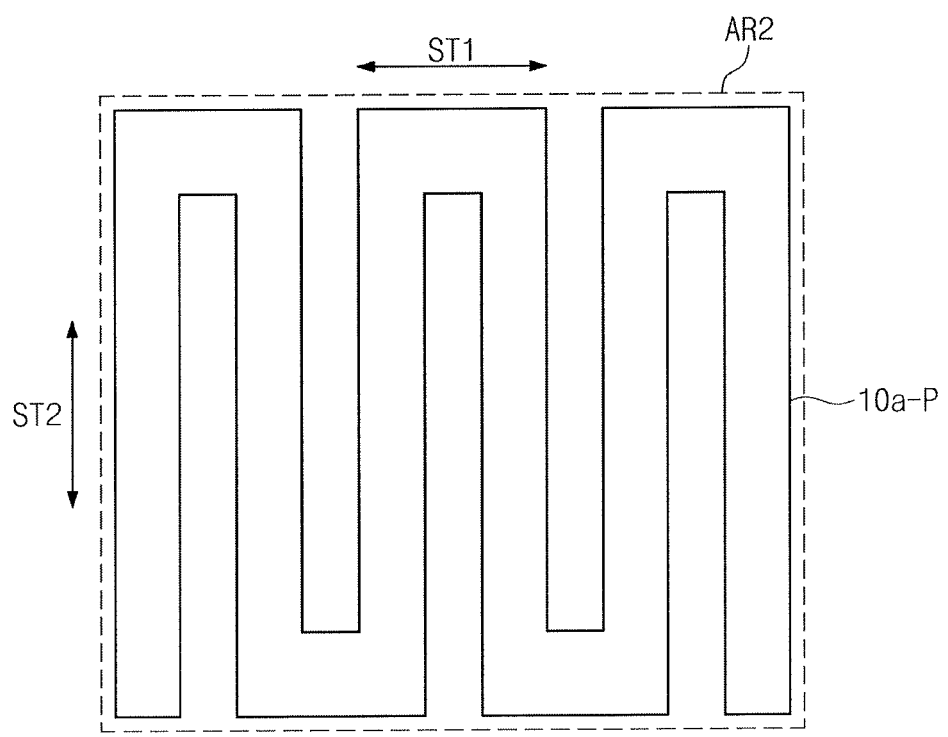
Figure 8A:
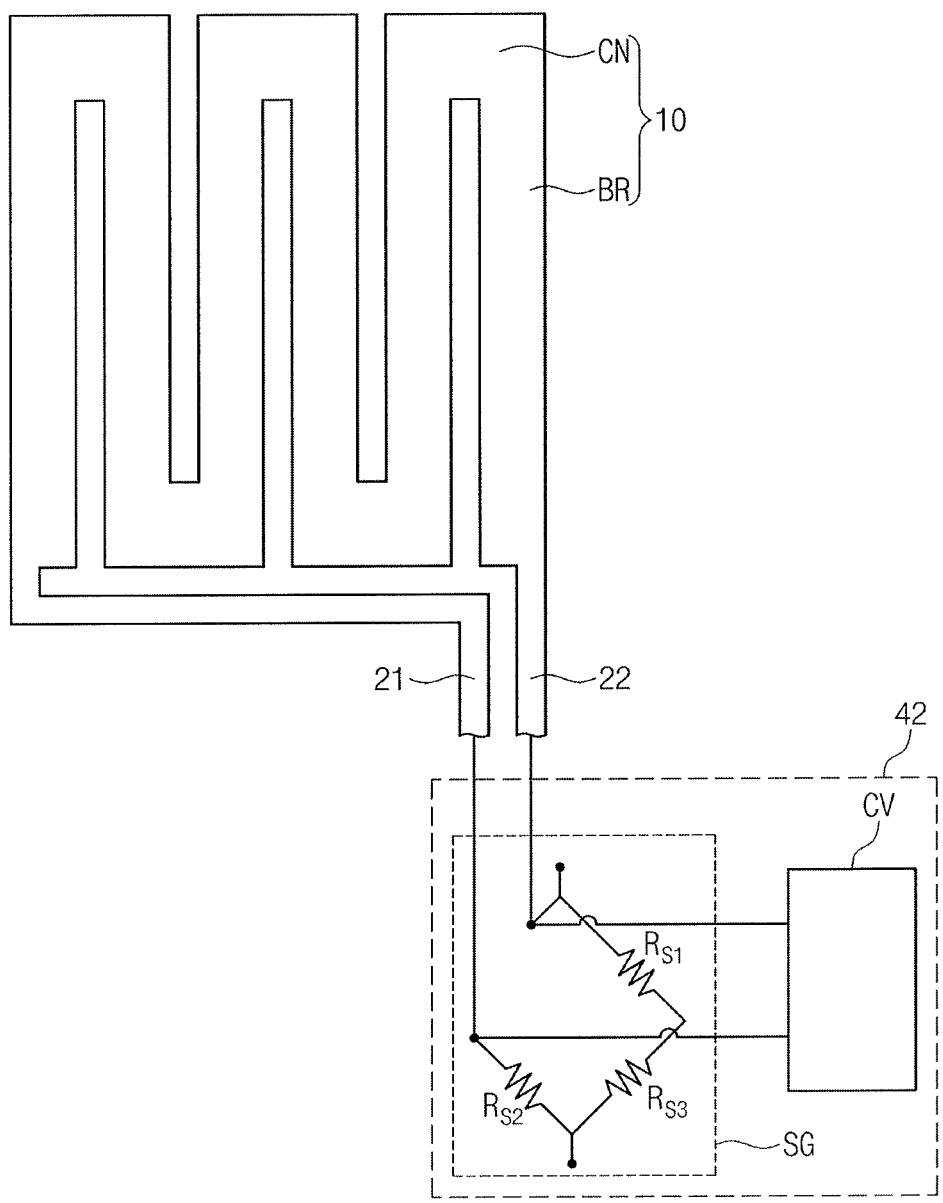
FIGS. 8A and 8B illustrate another example of the operation of an electronic apparatus in a second mode.
Figure 8B:
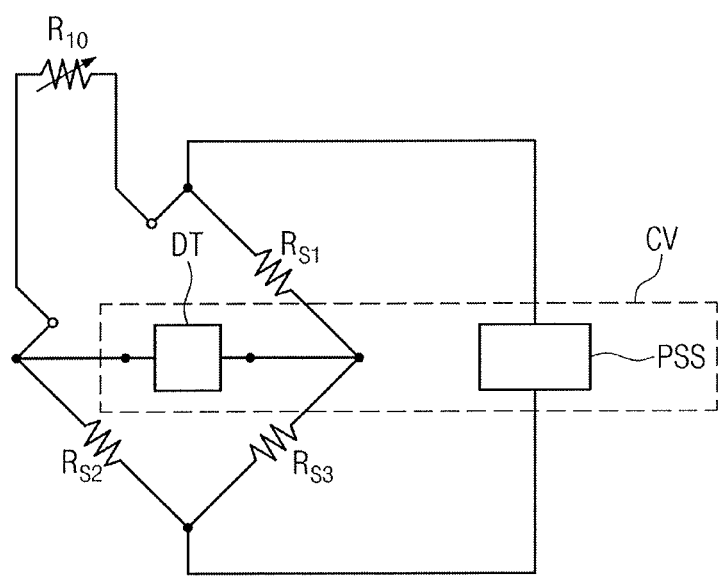

FIGS. 7A and 7B are cross-sectional views illustrating operation of the electronic apparatus in the second mode according to an embodiment. FIGS. 7C and 7D illustrate an example of a change of a sensing pattern in the second mode. FIGS. 8A and 8B illustrating operation of the electronic apparatus in the second mode according to one embodiment. In particular, some of the sensing patterns are illustrated in FIGS. 7A and 7B, and one sensing pattern is illustrated in FIGS. 7C and 7D. A circuit diagram relating to one sensing pattern is illustrated in FIGS. 8A and 8B.

The electronic apparatus may detect the intensity of a touch TB in the second mode. As illustrated in FIGS. 7A and 7B, as the touch TB is applied to the electronic apparatus with a predetermined pressure PS, at least portion of the sensing patterns may be deformed to correspond to the pressure PS. The first sensing pattern 10a to which the touch TB is applied is deformed by the touch TB and becomes a first sensing pattern 10a-P that is deformed in shape. The second sensing pattern 10b is not deformed and thus maintains its shape.

Referring to FIGS. 7C and 7D, one sensing pattern may be defined in a first area AR1 before the touch is applied. The first area AR1 may be an area in which the corresponding sensing pattern is able to detect the applied touch. The first area AR1 may have, for example, a tetragonal shape that entirely overlaps the one sensing pattern.

When the touch TB is applied based on the pressure PS, the shape of the one sensing pattern may be deformed. The sensing pattern 10a-P deformed in shape may have a shape different from that of the previous sensing pattern 10a, as a result of deformation of at least one of horizontal deformation ST1 or vertical deformation ST2.

Accordingly, the sensing pattern 10a-P deformed in shape may be defined in a second area AR2. An area occupied by the sensing pattern 10a-P deformed in shape may be greater than that of the first area AR1. For example, the length and cross-sectional area of the first sensing pattern 10a are deformed by the pressure PS. As the pressure PS increases, the first sensing pattern 10a increases in deformation rate and, in response thereto, the second area AR2 may increase in area.

As illustrated in FIGS. 8A and 8B, one sensing pattern 10 is connected to the force detecting driving part 42 in the second mode. The force detecting driving part 42 includes a plurality of resistors and the driving block CV. Each of the resistors may have a predetermined value. The resistors include a first resistor $R_{S1}$, a second resistor $R_{S2}$, and a third resistor $R_{S3}$.

The sensing pattern 10 may be represented as a fourth resistor $R_{10}$. The fourth resistor $R_{10}$ may be a variable resistor with a resistance that changes with the resistance value of the sensing pattern 10. As the sensing pattern 10 is deformed in response to the intensity of the touch TB, the fourth resistor $R_{10}$ varies in value.

In the current embodiment, the first to fourth resistors $R_{S1}$, $R_{S2}$, $R_{S3}$, and $R_{10}$ may be connected to each other to form a Wheatstone bridge. For example, the first to third resistors $R_{S1}$, $R_{S2}$, and $R_{S3}$ corresponding to the driving circuit and the fourth resistor $R_{10}$ corresponding to the sensor are connected to form a Wheatstone bridge. As the first to fourth resistors $R_{S1}$, $R_{S2}$, $R_{S3}$, and $R_{10}$ are connected in the Wheatstone bridge, the value of the fourth resistor $R_{10}$ that is the variable resistor may be obtained.

For example, as illustrated in FIG. 8B, in the Wheatstone bridge, a first element DT is connected between the second and fourth resistors and between the first and third resistors, and a second element PSS is connected between the first and fourth resistors and between the second and third resistors. The first element DT and the second element PSS correspond to the driving block CV.

The first element DT may detect electrical flow between the second and fourth resistors and between the first and third resistors. For example, the first element DT may a current indicating device or a voltage measurement device.

The second element PSS controls voltages between the first and fourth resistors and between the second and third resistors. The second element PSS may be, for example, a voltage supplying device.

The voltage value measured in the first element DT is generated when a voltage is supplied from the second element PSS to the Wheatstone bridge. When the touch TB having the predetermined pressure PS is applied to the sensing pattern 10, the sensing pattern 10 is deformed in shape in response to the intensity of the pressure PS. The resistance of an internal resistor of the sensing pattern 10 is changed by the deformation in shape. Thus, the voltage value measured in the first element DT may be changed.

The electronic apparatus according to the present embodiment may easily detect the intensity of the touch applied to the single layer conductive pattern in the second mode. Also, since the single layer conductive pattern is used to detect the position of the applied touch in the first mode, the electronic apparatus may detect both the position and the intensity of the touch with a single conductive pattern.

Figure 9A:
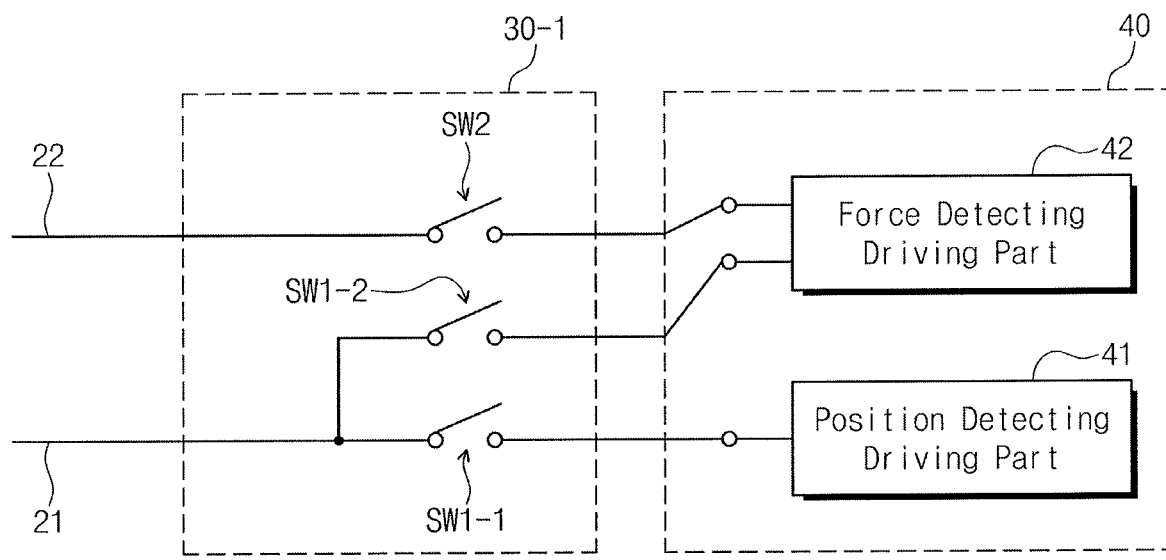
FIG. 9A illustrate another embodiment of a switching part and a driving circuit in FIG. 1.
Figure 9B:
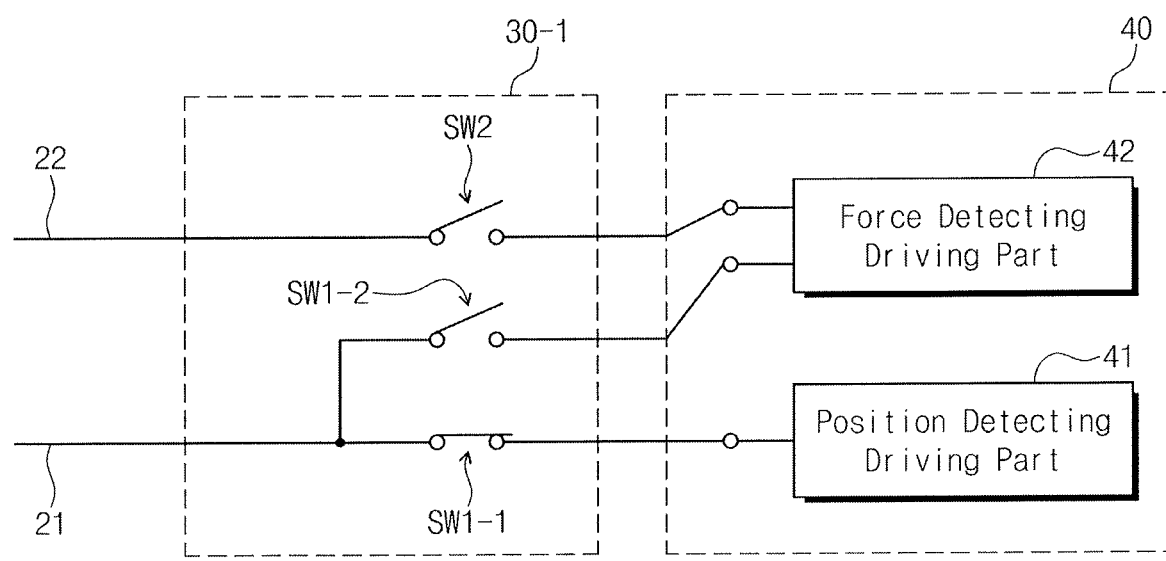
FIG. 9B illustrates a connection state of the switching part and driving circuit 40 in a first mode.
Figure 9C:
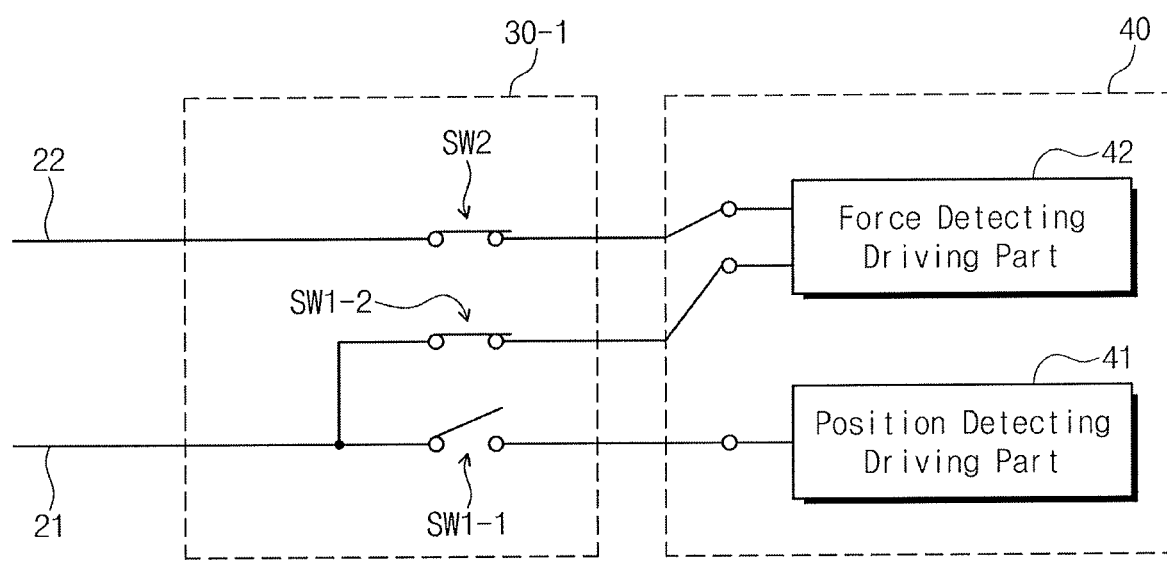
FIG. 9C illustrates a connection state of the switching part and driving circuit in a second mode.

FIG. 9A illustrate another embodiment of a switching part 30-1 and driving circuit 40 in FIG. 1. FIG. 9B illustrates a connection state of the switching part 30-1 and driving circuit 40 in the first mode. FIG. 9C illustrates a connection state of the switching part 30-1 and driving circuit 40 in the second mode.

As illustrated in FIG. 9A to 9C, a switching part 30-1 includes a first sub switching element SW1-1, a second sub switching element SW1-2, and the second switching element SW2. Each of the first sub switching element SW1-1 and the second sub switching element SW1-2 is connected to the first sensing line 21. The first sub switching element SW1-1 controls a connection between the first sensing line 21 and the position detecting driving part 41. The second sub switching element SW1-2 controls a connection between the first sensing pattern 21 and the force detecting driving part 42.

In the first mode illustrated in FIGS. 9A and 9B, the first sub switching element SW1-1 may turn on and the second sub switching element SW1-2 and the second sub switching element SW2 may turn off. Accordingly, only the position detecting driving part 41 of the driving circuit 40 may be connected to the sensing pattern through the first sensing line 21.

In the second mode illustrated in FIGS. 9A and 9C, the first sub switching element SW1-1 may turn off and the second sub switching element SW1-2 and the second switching element SW2 may turn on. Accordingly, the force detecting driving part 42 of the driving circuit 40 may be connected to the sensing pattern through the second sensing line 22.

The switching part 30-1 according to the present embodiment may control the connection according to the operation of the switching elements in a state in which the switching part 30-1 is connected to the position detecting driving part 41 and the force detecting driving part 42. In one embodiment, the driving circuit 40 may further include a switching element corresponding to the second sub switching element SW1-2, but the embodiment of the inventive concept is not limited thereto.

Figure 10A:
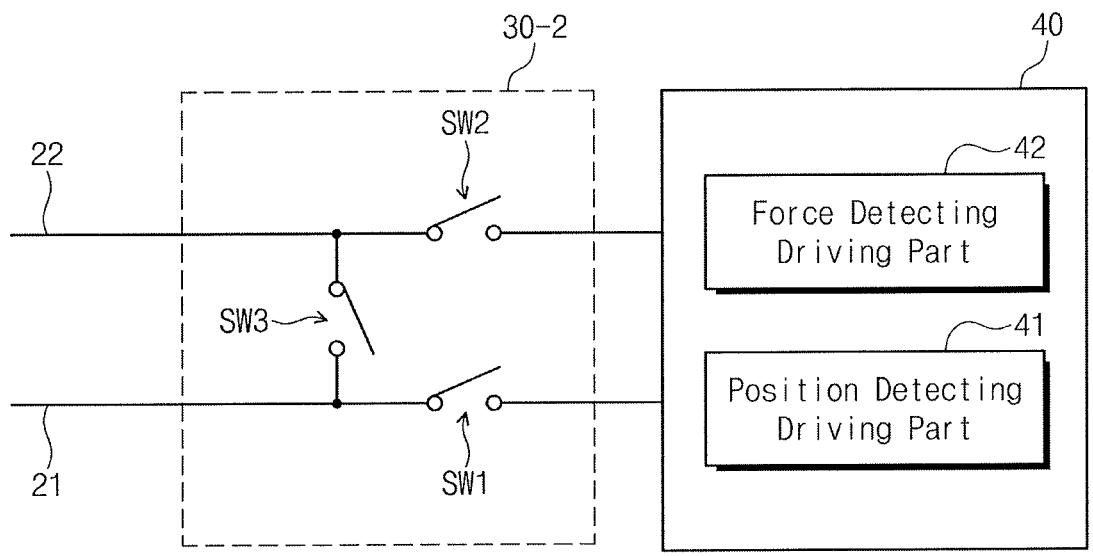
FIG. 10A illustrate another embodiment of a switching part and a driving circuit in FIG. 1.
Figure 10B:
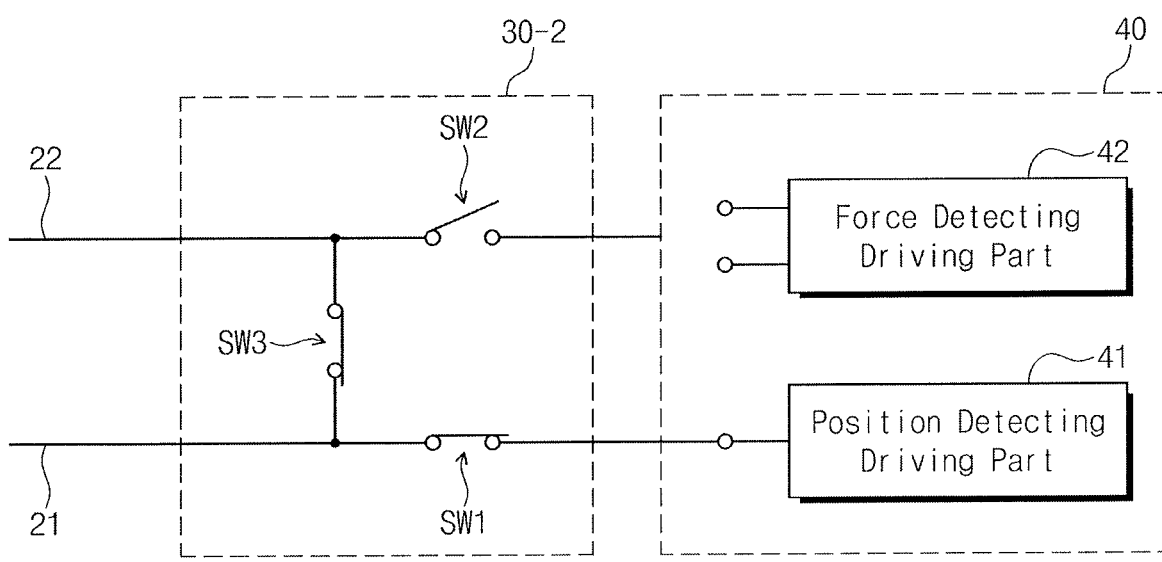
FIG. 10B illustrates a connection state of the switching part and driving circuit 40 in a first mode.
Figure 10C:
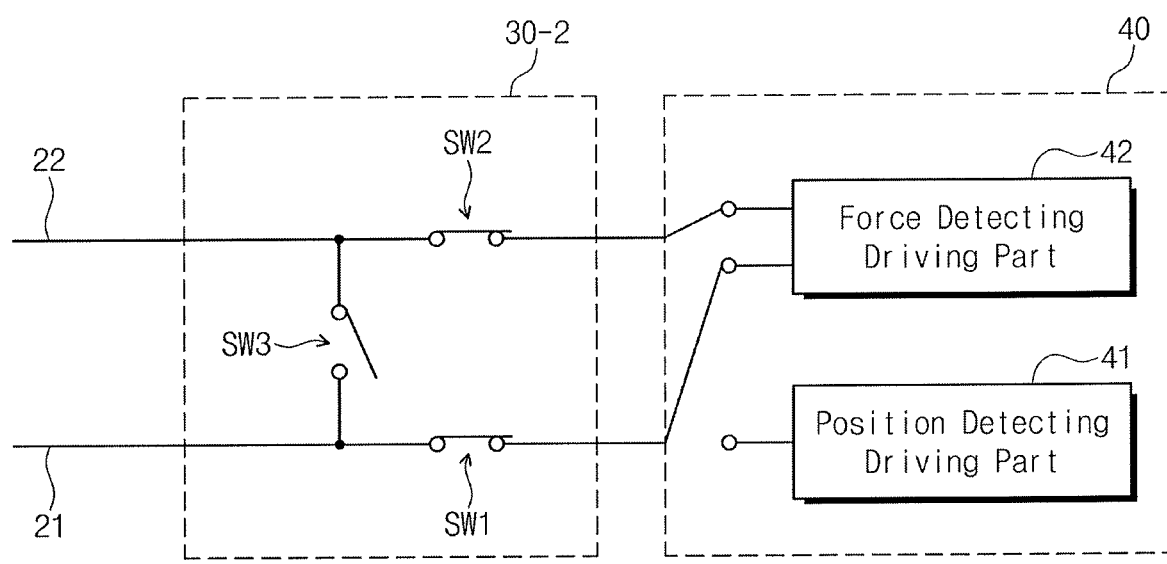
FIG. 10C illustrates a connection state of the switching part and driving circuit in a second mode.

FIG. 10A illustrate another embodiment of a switching part 30-2 and driving circuit 40 in FIG. 1. FIG. 10B illustrates a connection state of the switching part 30-2 and driving circuit 40 in the first mode. FIG. 10C illustrates a connection state of the switching part 30-2 and driving circuit 40 in the second mode.

As illustrated in FIGS. 10 to 10C, a switching part 30-2 may further include a third switching element SW3. The first switching element SW1 and the second switching element SW2 may respectively correspond to the switching elements SW1 and SW2. The third switching element SW3 is between the first sensing line 21 and the second sending line 22. Thus, the third switching element SW3 controls a connection between the first sensing line 21 and the second sensing line 22. The third switching element SW3 may turn on or turn off according to the mode.

For example, as illustrated in FIGS. 10A and 10B, the third switching element SW3 may turn on in the first mode. Accordingly, the first line 21 and the second line 22 are connected to each other. Since the first switching element SW1 turns on and the second switching element SW2 turns off, the second sensing line 22 may be also connected to the position detecting driving part 41. As the third switching element SW3 turns on, the first sensing line 21 may have the substantially same electric potential as the second sensing line 22.

Compared to the electronic apparatus of FIG. 3A, in which the second sensing line 22 maintains in an open state in the first mode, the second sensing line 22 of the electronic apparatus of FIG. 10A is connected to the first sensing line 21. Thus, the sensor may decrease in internal resistance, and thus the electronic apparatus may have improved touch sensitivity.

As illustrated in FIGS. 10A and 10C, the third switching element SW3 may turn off in the second mode. Since each of the first switching element SW1 and the second switching element SW2 turns on, each of the first sensing line 21 and the second sensing line 22 may be connected to the force detecting driving part 42. The first sensing line 21 and second sensing line 22 may transmit different electrical signals. The first sensing line 21 and second sensing line 22 may have different electrical potentials.

The electronic apparatus according to the present embodiment may further include the third switching element SW3 to decrease the resistance of the sensor in the first mode. Accordingly, touch sensitivity characteristics of the sensor may be improved.

Figure 11A:
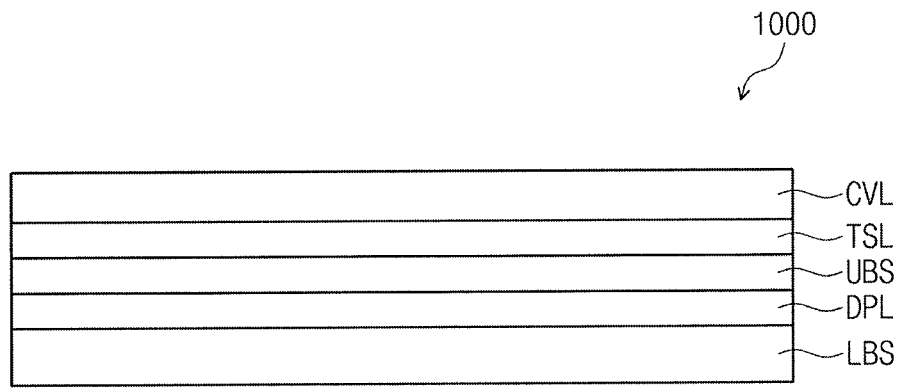
FIGS. 11A-11C illustrate embodiments of an electronic apparatus.
Figure 11B:
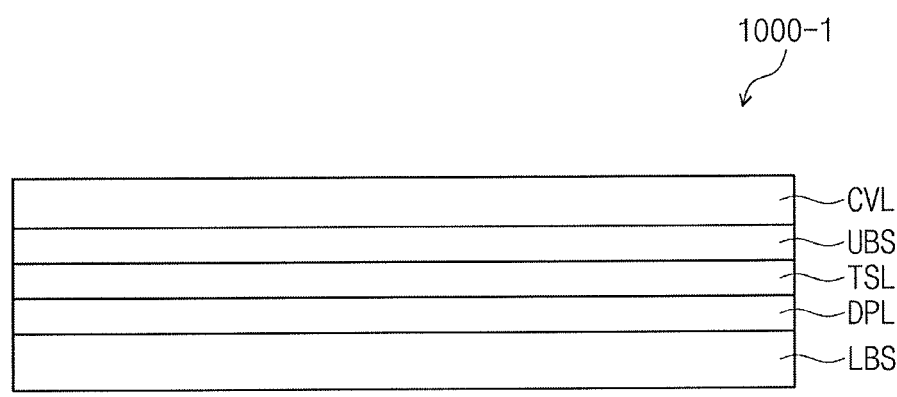
Figure 11C:
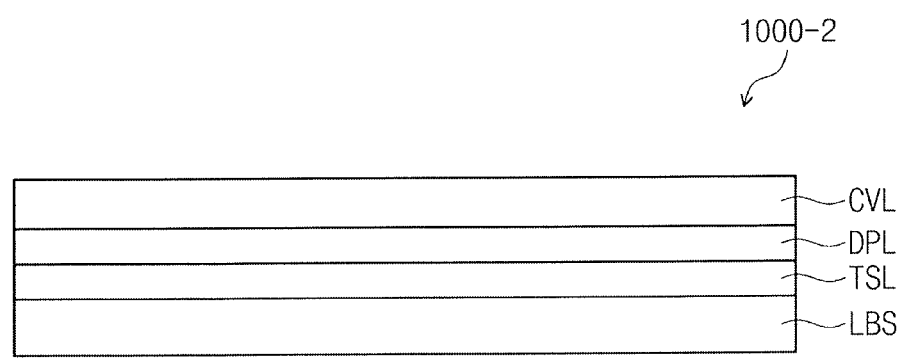

FIG. 11A-11C illustrates cross-sectional views of embodiments of an electronic apparatus. As illustrated in FIG. 11A, an electronic apparatus 1000 may include a lower base layer LBS, a display layer DPL, an upper base layer UBS, a detection layer TSL, and a cover layer CVL. The display layer DPL is between the lower base layer LBS and the upper base layer UBS.

The lower base layer LBS may be electrically insulated and, for example, may be an insulation substrate, an insulation film, or a structural body in which a plurality of organic films and/or a plurality of inorganic films are laminated. The lower base layer LBS may be a base layer including electronic elements of the electronic apparatus 1000. The lower base layer LBS may correspond, for example, to base layer BS in FIG. 4B.

The display layer DPL displays an image according to an electrical signal. The display layer DPL may include a plurality of pixels. Each pixel may include at least one thin film device and a display device connected to the thin film device. The thin film device may be a switching element that turns on or turns off the pixel or may be a driving device that supplies a predetermined driving voltage to the pixel.

The display device may generate light based on the electrical signal. The electrical signal may control, for example, light transmittance. The display device may be, for example, liquid crystal display device, an organic light emitting device, an electrophoretic device, or an electrowetting device.

The upper base layer UBS covers the display layer DPL and may include an encapsulation layer that encapsulates the display layer DPL. The upper base layer UBS prevents the detection layer TSL from directly contacting the display layer DPL. The upper base layer UBS may include a plurality of organic films and/or inorganic films. The upper base layer UBS protects the display layer DPL from external contamination or moisture.

The detection layer TSL includes, for example, the plurality of sensing patterns 10 and the plurality of first and second sensing lines 21 and 22 in FIG. 1. At least one of the switching part 30 or the driving circuit 40 may be in the detection layer TSL and on the upper base layer UBS. For example, the switching part 30 may be on the upper base layer UBS. In one embodiment, the switching part 30 and the driving circuit 30 are separately provided and electrically connected to the detection layer TSL.

The detection layer TSL may be directly disposed on the upper base layer UBS. Thus, the sensing patterns 10 may contact the upper base layer UBS. Accordingly, the electronic apparatus 1000 may have a slim thickness and be advantageous in portability and folding operation.

The cover layer CVL is on the detection layer TSL and covers the detection layer TSL. The cover layer CVL may be electrically insulated and, for example, may correspond to the insulation layer IL in FIG. 4B. In one embodiment, the cover layer CVL may include additional insulation layers in addition to the insulation layer IL.

In an electronic apparatus 1000-1 as illustrated in FIG. 11B, the detection layer TSL may be under the upper base layer UBS. In one embodiment, the detection layer TSL may be between the display layer DPL and upper base layer UBS.

The electronic apparatus 1000-1 may further include at least one insulation layer between the detection layer TSL and the display layer DPL.

In the electronic apparatus 1000-2 illustrated in FIG. 11C, the detection layer TSL may be between the lower base layer LBS and the display layer DPL. The cover layer CVL is on the display layer DPL. The detection layer TSL may be in a display panel which includes the lower base layer LBS and display layer DPL. The electronic apparatus 1000-2 may be a thin-type touch screen panel with the detection layer TSL and display layer DPL mounted on one base substrate.

In accordance with one or more of the aforementioned embodiments, the electronic apparatus may detect the touch applied from the outside and display the image using the display layer DPL. Accordingly, an electronic apparatus may be provided that detects a user input and also provides information based on the user input.

In accordance with one or more of the aforementioned embodiments, a detection layer may be provided which is capable of detecting both the intensity and the position of the touch.

In accordance with one or more of the aforementioned embodiments, an electronic apparatus may include a single conductive pattern to detect whether a touch is applied and how intense the touch is. An electronic apparatus that is slim may therefore be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. An electronic apparatus, comprising:
   a base substrate;
   a plurality of sensing patterns disposed on the base substrate with a single conductive layer in a display area of the electronic apparatus, each of the sensing patterns being to detect touch and pressure, the sensing patterns being arranged in a matrix shape along a first direction and a second direction in the display area;
   a driving circuit including a position detector and an intensity detector; and
   a switching circuit to selectively connect one of the position detector or the intensity detector to the plurality of sensing patterns, wherein:
   each of the sensing patterns comprises a plurality of branch parts extending along the first direction or the second direction and a plurality of connection parts connecting the branch parts,
   each of the sensing patterns is selectively connected to the position detector, to operate as a touch position detection pattern formed by the branch parts and the connection parts in a first mode, and
   each of the sensing patterns is selectively connected to the intensity detector, to operate as a strain gauge formed by the branch parts and the connection parts in a second mode different from the first mode,
   wherein the switching circuit is disposed between a plurality of sensing lines and the driving circuit, the position detector is connected to a first sensing line through the switching circuit in the first mode, and the intensity detector is connected to the first sensing line and a second sensing line through the switching circuit in the second mode,
   wherein the switching circuit comprises:
      a first switch to control a connection between the first sensing line and the driving circuit;
      a second switch to control a connection between the second sensing line and the driving circuit; and
      a third switch to control a connection between the first sensing line and the second sensing line,
   wherein in the first mode, the first switch and the third switch are turned on and the second switch is turned off, and
   wherein in the second mode, the third switch is turned off, and each of the first switch and the second switch is turned on.

2. The electronic apparatus as claimed in claim 1, wherein the sensing patterns, the first sensing line, and the second sensing line are on a same layer.

3. The electronic apparatus as claimed in claim 1, wherein the first mode is to detect a position of the touch based on a self-capacitance measurement of each of the sensing patterns.

4. The electronic apparatus as claimed in claim 1, wherein the second mode is to detect an intensity of the touch based on a deformation of shape of each of the sensing patterns in response to the touch.

5. The electronic apparatus as claimed in claim 4, wherein the deformation of shape of each of the sensing patterns corresponds to a change in a planar area of each of the sensing patterns.

6. The electronic apparatus as claimed in claim 1, further comprising:
   a display layer, between the base substrate and the sensing patterns, to display an image; and
   an encapsulation layer between the display layer and the sensing patterns and covering the display layer.

7. The electronic apparatus as claimed in claim 6, wherein the sensing patterns are directly disposed on the encapsulation layer.

8. The electronic apparatus as claimed in claim 1, wherein one of the plurality of branch parts is directly connected to the first sensing line of the plurality of sensing lines and other one of the plurality of branch parts is directly connected to the second sensing line of the plurality of sensing lines.

* * * * *